United States Patent
Asbury et al.

(10) Patent No.: US 7,447,922 B1
(45) Date of Patent: Nov. 4, 2008

(54) SUPPLYING POWER FROM PERIPHERAL TO HOST VIA USB

(75) Inventors: Ray Asbury, Eagle, ID (US); Steven Connelly, Boise, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 547 days.

(21) Appl. No.: 11/137,175

(22) Filed: May 24, 2005

Related U.S. Application Data (60) Provisional application No. 60/582,436, filed on Jun. 23, 2004.

(51) Int. Cl.
*G06F 1/26* (2006.01)

(52) U.S. Cl. ........................ 713/300; 710/303

(58) Field of Classification Search ........... 713/300; 710/303
See application file for complete search history.

(56) References Cited

U.S. PATENT DOCUMENTS

| | | | |
|---|---|---|---|
| 5,905,389 A | 5/1999 | Alleven | |
| 5,912,569 A | 6/1999 | Alleven | |
| 5,929,664 A | 7/1999 | Alleven | |
| 6,040,792 A | 3/2000 | Watson et al. | |
| 6,073,193 A | 6/2000 | Yap | |
| 6,124,750 A | 9/2000 | Alleven et al. | |
| 6,389,494 B1 | 5/2002 | Walton et al. | |
| 6,541,879 B1 | 4/2003 | Wright | |
| 6,625,761 B1 | 9/2003 | Sartore et al. | |
| 6,653,813 B2 * | 11/2003 | Khatri | 320/103 |
| 6,668,296 B1 * | 12/2003 | Dougherty et al. | 710/303 |
| 6,671,831 B1 | 12/2003 | Sartore et al. | |
| 6,691,201 B1 | 2/2004 | Williams et al. | |
| 6,754,725 B1 | 6/2004 | Wright et al. | |
| 6,813,672 B1 | 11/2004 | Kamran et al. | |
| 6,820,160 B1 | 11/2004 | Allman | |
| 6,839,778 B1 | 1/2005 | Sartore et al. | |
| 7,159,132 B2 * | 1/2007 | Takahashi et al. | 713/310 |

OTHER PUBLICATIONS

USB Promoters Group, Universal Serial Bus specification, Revision 2.0, Apr. 27, 2000, pp. 1-650.

* cited by examiner

*Primary Examiner*—Chun Cao
*Assistant Examiner*—Albert Wang
(74) *Attorney, Agent, or Firm*—Blakely, Sokoloff, Taylor & Zafman LLP (57) ABSTRACT

A method and system is provided for supplying power to a host via a USB port. The power is transmitted to the host using the standard VBUS and GND lines that are part of standard USB cables and connectors. The peripheral device includes a special USB descriptor block. During the standard enumeration process, the host reads this USB descriptor block and recognizes that the device can provide power to the host. A set feature command is used to start the power transmission to the host.

20 Claims, 7 Drawing Sheets

| bmRequestType | bRequest | Wvalue | wIndex | wLength | Data |
|---|---|---|---|---|---|
| 00000000B | SET_FEATURE | device_supply_power | requested_voltage | clear_on_suspend | None |

Figure 6

| bmRequestType | bRequest | Wvalue | wIndex | wLength | Data |
|---|---|---|---|---|---|
| 00000000B | CLEAR_FEATURE | device_supply_power | Zero | Zero | None |

Figure 7

SUPPLYING POWER FROM PERIPHERAL TO HOST VIA USB

RELATED APPLICATION

The present application is a non-provisional application of provisional application Ser. No. 60/582,436 filed Jun. 23, 2004. Priority of application 60/582,436 is hereby claimed and the entire content of application 60/582,436 is hereby incorporated herein by reference.

FIELD OF THE INVENTION

The present invention relates to computer systems and more particularly to power supplies for computer systems and to Universal Serial Bus (USB) circuitry.

BACKGROUND

Portable computers and various other portable electronic devices include a battery that must be periodically re-charged. Separate power supplies that are used to recharge batteries are very common devices. Frequently external power supplies connect to electronic devices that include batteries by means of a power cable. Alternatively, many electronic devices can be plugged into docking stations that include a fixed connection to an external power supply.

Many electronic devices include Universal Serial Bus (USB) ports. The USB ports on currently available electronic devices generally conform to either the "Universal Serial Bus Revision 1.1" specifications" or to the "Universal Serial Bus Revision 2.0" specifications. These specifications are widely known and widely available.

Ports that conform to the USB specifications can supply power from the host to peripheral devices. That is, a USB bus connection can be used to supply power to a peripheral device. The USB specification defines a low power mode and a high power mode. In the lower power mode the host provides no more than 100 ma of current at five volts. In high power mode, the host can provide up to 500 ma of current at five volts. Thus, according to the USB specification a maximum of 2.5 watts of power can be provided from the host to a peripheral device on a USB port.

In all cases, the USB specifications are directed to providing power from the host to the peripheral devices. The power is provided via the VBUS and GND lines that are two of the four lines in standard USB cables and connectors.

SUMMARY

The present invention is directed to providing power in the opposite direction to that defined in the USB specification. That is, with the present invention, power is provided from a peripheral device to a host. The power is supplied to the host via a standard USB port connection. The power can be used to charge a battery in the host, and it can eliminate the need for a separate power connection to the host.

In one embodiment a fixed voltage is provided to the host. In another embodiment a variable voltage is provided to the host. The power is transmitted to the host using the standard VBUS and GND lines that are part of standard USB cables and connectors.

A special USB descriptor is provided in the peripheral device. During the standard USB enumeration process, the host reads this descriptor and recognizes that the device can provide power to the host. The host can therefore request power from the peripheral device if the host has the appropriate circuitry to accept the power.

DETAILED DESCRIPTION

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. In situations where an element is shown in multiple figures, the same reference numeral is used to denote the element in all the figures.

Only those parts of the various units are shown and described that are necessary to convey an understanding of the embodiments to those skilled in the art. Those parts and elements of various elements that are not explicitly shown and described are conventional and known in the art.

Figure 1:
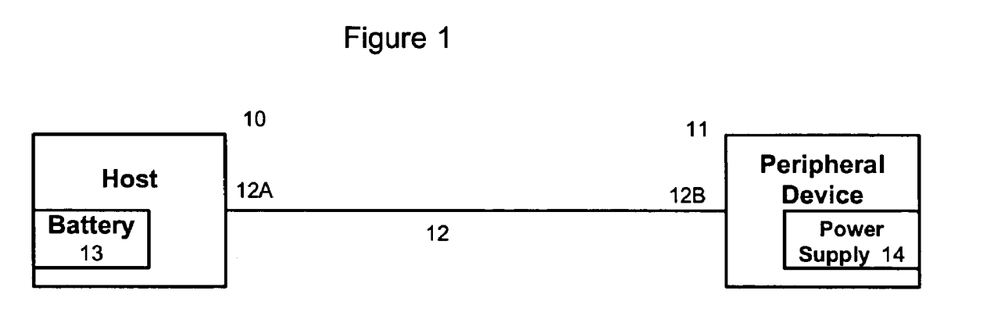
FIG. 1 is an overall system diagram

An overall block diagram of a first embodiment is illustrated in FIG. 1. As illustrated in FIG. 1, a host 10 is connected to a peripheral device 11 by a USB cable 12. The host 10 can, for example, be a conventional laptop personal computer that includes some special battery charging circuitry that is described below. Likewise, peripheral device 11 can be a conventional peripheral device that includes some special circuitry that is described below. Peripheral device 11 could, for example be a USB connected, printer, scanner, camera, docking station, etc.

The host 10 is connected to the peripheral device 11 by means of a conventional standard USB cable 12. Cable 12 has conventional connectors 12A and 12B that connect the cable to ports on the host 10 and on the peripheral device 11.

The host 10 includes a battery 13. According to the USB specifications, a peripheral device can draw power from a host over a USB connection. The USB specifications define a low power mode and a high power mode. In the lower power mode the host supplies up to 100 milliamps of current. In the high power mode the host supplies up to 500 milliamps of current. In both the low power mode and high power mode, the power is supplied at 5 volts. In the embodiment shown in FIG. 1, host 10 can supply power at 5 volts to peripheral device 11. A host supplying power to a peripheral device over a USB connection is conventional.

The novel aspect of the embodiments shown in FIG. 1 is that a power supply 14, in peripheral 11, can supply power to charge the battery 13 in host 10. That is, in the embodiment shown in FIG. 1, power can flow from peripheral device 11 to host 10 over USB cable 12. The power flowing to host 10 can be used the re-charge the battery 13 in the host 10.

It is noted that data can travel both ways on the USB connection 12 while power is either flowing from the host 10 to peripheral device 11 or from peripheral device 11 to host 10.

An advantage of the embodiment shown in FIG. 1 is that the host 10 (which could for example be a laptop computer) does not need to have a separate connection to an external source to charge battery 13. Eliminating the need for a separate connection to received external power can simplify the host 10 and/or reduce the cost of host 10.

Figure 2:
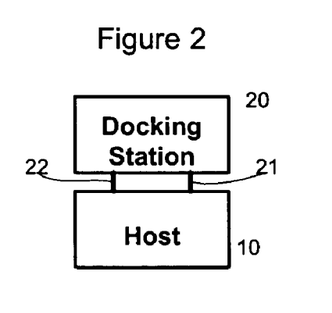
FIG. 2 illustrates a host computer in a docking station.

FIG. 2 shows the host 10 in a docking station 20. A docking station is a device that is designed to connect a laptop computer to various peripheral devices. For example, a docking station can provide connection from a laptop to external units such as printers, displays, networks, etc. In the prior art, docking stations frequently provided a connector that connected an external power supply to the battery charging circuit in the laptop.

With the embodiments shown herein, no such power connector is required between the docking station 20 and the host computer 10. Instead power is provided to the host 10 through a USB connection. That is, docking station 20 is one specific example of a peripheral device 11 that contains a power supply 14 that provides power to the host 10. If the peripheral device 11 is a docking station, the power supply 14 (and the other circuitry described below and shown in FIG. 4) would be in a USB hub. Such a USB hub in a docking station would also provide conventional connections for other USB peripheral devices that were outside the docking station.

In the embodiment illustrated in FIG. 2, the docking station 20 has two signal carrying connectors 21 and 22. Connector 21 is a conventional USB connection that provides a USB connection similar to cable 12. In the example described above, the USB cable would connect to a USB Hub that had a power supply 14 (and the other associated circuitry shown in FIG. 4).

Connector 22 is a conventional connector that provides a conventional connection to a display device. In other embodiments, other connectors such as, for example, an ATA connector to a data storage device or an Ethernet connection to a network are provided. However, with the use of the present invention, there is no need for a separate power connector to supply power to the battery charging circuit in host 10.

Figure 3:
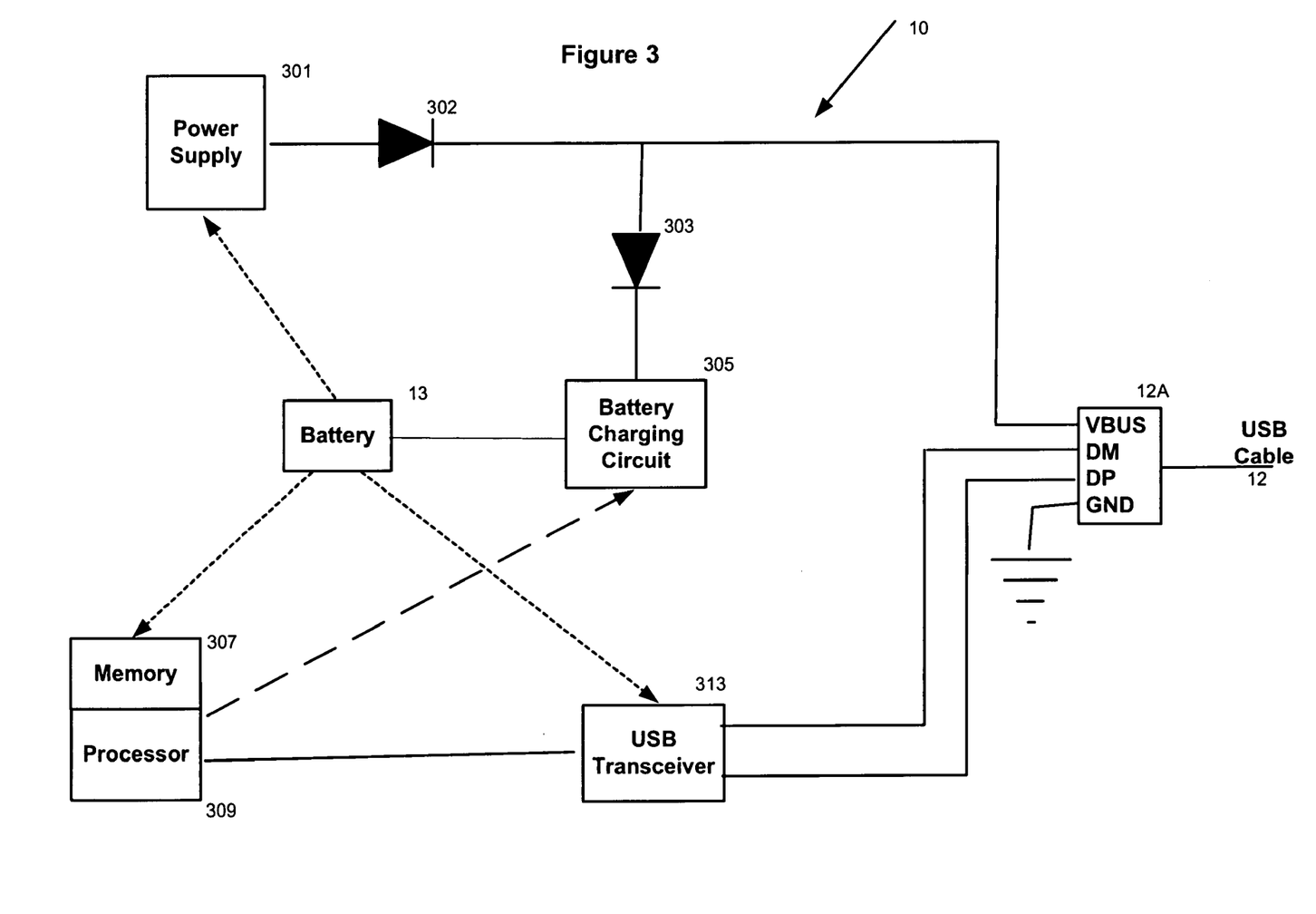
FIG. 3 is a block circuit diagram of the battery charging circuitry in a host.

A block circuit diagram of the circuitry in host 10 that allows the battery 13 to be charged by power supplied from the USB cable 12 is shown in FIG. 3. As is conventional the USB cable 12 and the USB connector 12A have four separate lines. Data travels bi-directionally between the host 10 and the peripheral device 11 on lines DM and DP. In conventional operation, according the USB specifications, power is provided to the peripheral device by a voltage that the host applied between the lines VBUS and GND.

Host 10 includes a conventional power supply 301 that can supply a 5 volt signal to the VBUS line (i.e. between the VBUS and GND lines). In accordance with the USB specifications, this power is supplied in either a low power mode or a high power mode. In the low power mode, the host supplies up to 100 milliamps of current. In the high power mode, up to 500 milliamps of current is supplied by the host. In both the low power and high power modes, the power is supplied to the peripheral at 5 volts.

The dotted line from battery 13 to power supply 301, indicates that the power supply 301 is driven by power from battery 13. A diode 303 prevents the battery 13 from supplying a voltage directly to the VBUS line.

In order to charge the battery 305, the peripheral device, under certain circumstances, applied a relatively high potential between VBUS and GND. For example, the peripheral device may apply 30 volts between lines VBUS and ground. A diode 302 prevents this voltage from affecting power supply 301.

The host 10 includes a battery charging circuit 305. Circuit 305 is a conventional circuit that accepts an input voltage and provides an appropriate battery charging voltage. In the specific embodiment described here, the battery charging circuit 305 accepts a 30 volt input from the VBUS line and provides an appropriate charging voltage to battery 13.

As is conventional, host 10 includes a memory 307, a processor 309, and a USB transceiver 313. These units are all powered from battery 13 as indicated by the dotted lines in the Figure. The memory 307, the processor 309, and the USB transceiver 313 are conventional units. The processor 309 controls the battery charging circuit 305 as indicated by the dotted line in the FIG. 3. As is conventional the processor 309 sends data and commands out on the USB via transceiver 313 and it receives information from the USB via transceiver 313.

Figure 4:
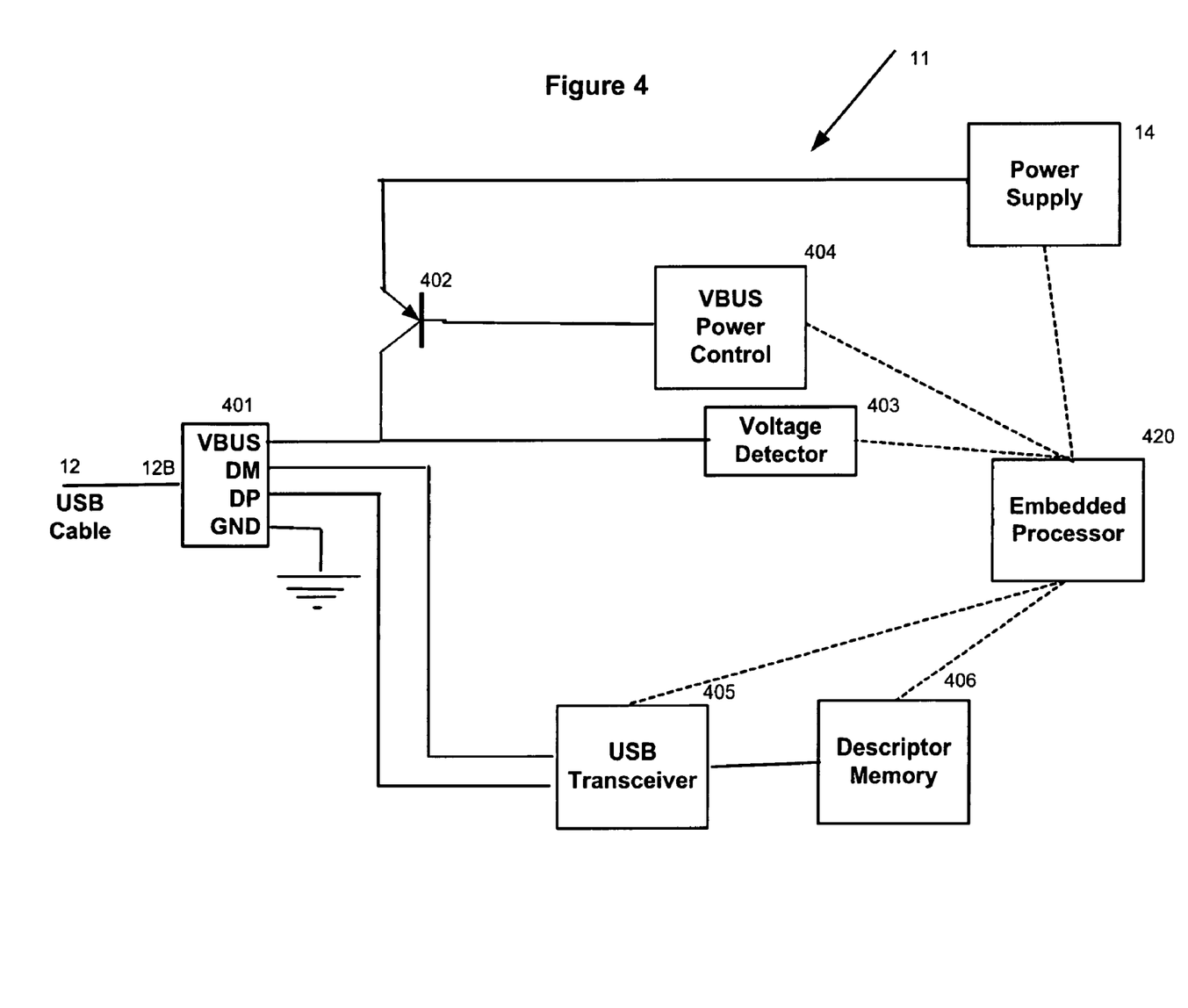
FIG. 4 is a block circuit diagram of a peripheral device.

FIG. 4 is a block diagram of the circuitry in the peripheral device 11 that is used to provide power to the host 10. Power supply 14 in peripheral device 11 is connected to the VBUS line in the connector 12B. However, switch 402 and VBUS Power Control 404 controls when the voltage from power supply 14 is applied to the VBUS line. A voltage detector 403 can detect whether or not host 10 is applying a voltage to the VBUS line. If the peripheral device 11 is not supplying a voltage to the VBUS line (such as prior to receiving an instruction from the host to apply a voltage to the VBUS line) and no voltage is detected on the VBUS line, this indicates to the peripheral device that the host is not operating. This is explained in more detail below with respect to FIGS. 8, 9 and 10.

A conventional USB transceiver 405 is connected to the DM and DP lines from the USB cable. A conventional descriptor memory stores descriptors that can be interrogated by host 10 during a conventional USB enumeration operation. An embedded processor 420 controls operation of the other components, as is conventional. The control from the embedded processor to various circuits is indicated by the dotted lines in FIG. 4. Processor 420 receives commands and data from transceiver 405 and processor 420 sends data to the host via transceiver 405 as is conventional. Processor 420 controls the VBUS power control 404 in response to signals it receives from the host and in response to signals from voltage detector 403 as described below.

A special USB descriptor (termed a Device Supplied Power Descriptor or DSPD) is stored in the descriptor memory 406 to indicate that the peripheral device can supply power to the host 10. The host 10 interrogates this special descriptor during the normal USB enumeration operation. The descriptor informs the host 10 that this particular peripheral device has the capability of supplying power to charge the battery in host 10. The USB descriptor (or descriptors) inform the host as to what particular voltage or voltages can be supplied by the peripheral device. A host uses this information to determine if the voltage (or voltages) that the particular peripheral device can supply is appropriate for the circuitry in a particular host.

In the first embodiment shown in FIGS. 1 to 4, the peripheral device provides a fixed voltage to the host. In other embodiments, which are described below, the peripheral device can provide multiple different voltages to the host or the peripheral device can provide a variable voltage to the host.

The USB descriptor is stored in descriptor memory 406 for the first embodiment consists of three bytes of information and it has the following conventional form:

| Offset | Field | Size | Value | Description |
|---|---|---|---|---|
| 0 | bLength | 1 | Number (3) | Size of Descriptor |
| 1 | bDescriptorType | 1 | Constant | DSPD Fixed type |
| 2 | bFixedVoltage | 1 | Number | Note: A value of zero is invalid. |

As indicated by the above table, the length of the descriptor is 3 bytes. The first byte gives the length as 3. The second byte is the Descriptor Type. This is a constant (i.e. a fixed value) that identifies this particular descriptor. For example it may indicate that the peripheral can supply a fixed voltage to the host. The third byte is a number that indicates the voltage that can be supplied to the host.

Three different embodiments will be described with respect to the voltages that can be supplied to the host by the peripheral device.

1) In the first embodiment, the peripheral can merely provide the host with one fixed voltage. For example the peripheral may be able to only a single voltage, which in the first specific embodiment described here is 30 volts.

2) In a second embodiment, the peripheral can provide the host with a number of fixed voltages. For example the peripheral may be able to provide the host with voltages of 30 and 40 volts.

3) In a third embodiment, the peripheral device can provide a variable voltage to the host. For example the peripheral device may be able to provide voltages to the host at any voltage between 30 and 40 in 0.2 volt increments. In the first specific embodiment described herein the voltage is 30 volts and hence the number 30 would be stored in this field. It is noted that a value of zero is not acceptable in that it conflicts with the general meaning of this descriptor. Furthermore, it is noted that different embodiments can provide different values of voltage values. In this embodiment, the voltage can only be specified in 0.2 volt increments. Naturally, this particular value is a matter of engineering design in each embodiment.

The first specific embodiment uses one Fixed Voltage DSPD which has the form given above, where the third byte of the descriptor will give the one particular voltage that can be supplied. In the first specific embodiment shown herein, the single fixed voltage is 30 volts.

The second embodiment, which can supply two fixed voltages, uses two Fixed Voltage DSPDs, one for each particular voltage that can be supplied. For example if the peripheral device can supply either 30 or 40 volts, there will be one DSPD that specifies 30 volts and one DSPD that specifies 40 volts.

The third embodiment, which can supply a variable voltage, uses a four byte descriptor having the form:

| Offset | Field | Size | Value | Description |
|---|---|---|---|---|
| 0 | bLength | 1 | Number (4) | Size of Descriptor |
| 1 | bDescriptorType | 1 | Constant | DSPD Variable type |
| 2 | bMaxVoltage | 1 | Number | Maximum supported output voltage in 0.2 Volt increments. |
| 3 | bMinVoltage | 1 | Number | Minimum supported output voltage in 0.2 Volt increments. |

In the descriptor for the third embodiment, the maximum and the minimum voltages are specified. While it is a matter of engineering choice, in the specific third embodiment described herein, the maximum and minimum voltages can only be specified in 0.2 volt increments as indicated above.

It is noted that the specific voltage or voltages supplied to the host by the peripheral device is a matter of engineering design choice. In most situations, for practical reasons, the voltage applied will be substantially higher than five volts. For example the first specific embodiment supplies 30 volts to the host. Any voltage above five volts would in fact work; however, a voltage substantially higher than five volts would generally be used to reduce the amount of time required to charge the battery in the host. A higher voltage will enable the battery to be charged more quickly. The upper limit of the voltage supplies to the host would also be determined by practical engineering considerations and by circuit cost considerations. Safety concerns should also be taken into affect in choosing a higher voltage.

Figure 5:
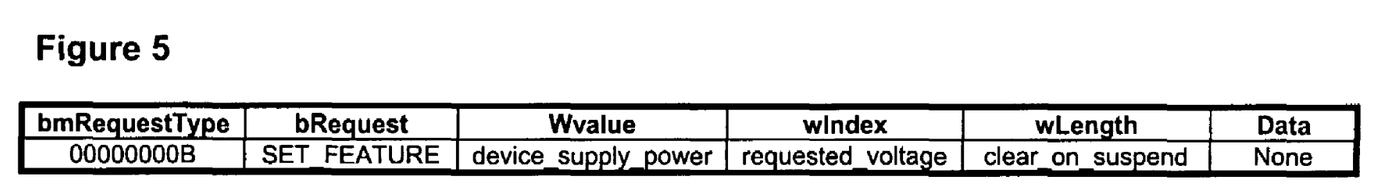
FIGS. 5 and 6 show the format of commands issued by the host.

During the USB enumeration operation the host will read the descriptors, and if the host circuitry is compatible with the voltage (or voltages) specified by the descriptors read from a particular peripheral device, the host will be in a position to accept power from the peripheral device. When the host would like to receive power from the peripheral device, the host will issue a Set Feature command with the format shown in FIG. 5. When the host no longer desires to receive power, the host will issue a Clear Feature command that has the format shown in FIG. 6.

Figure 7:
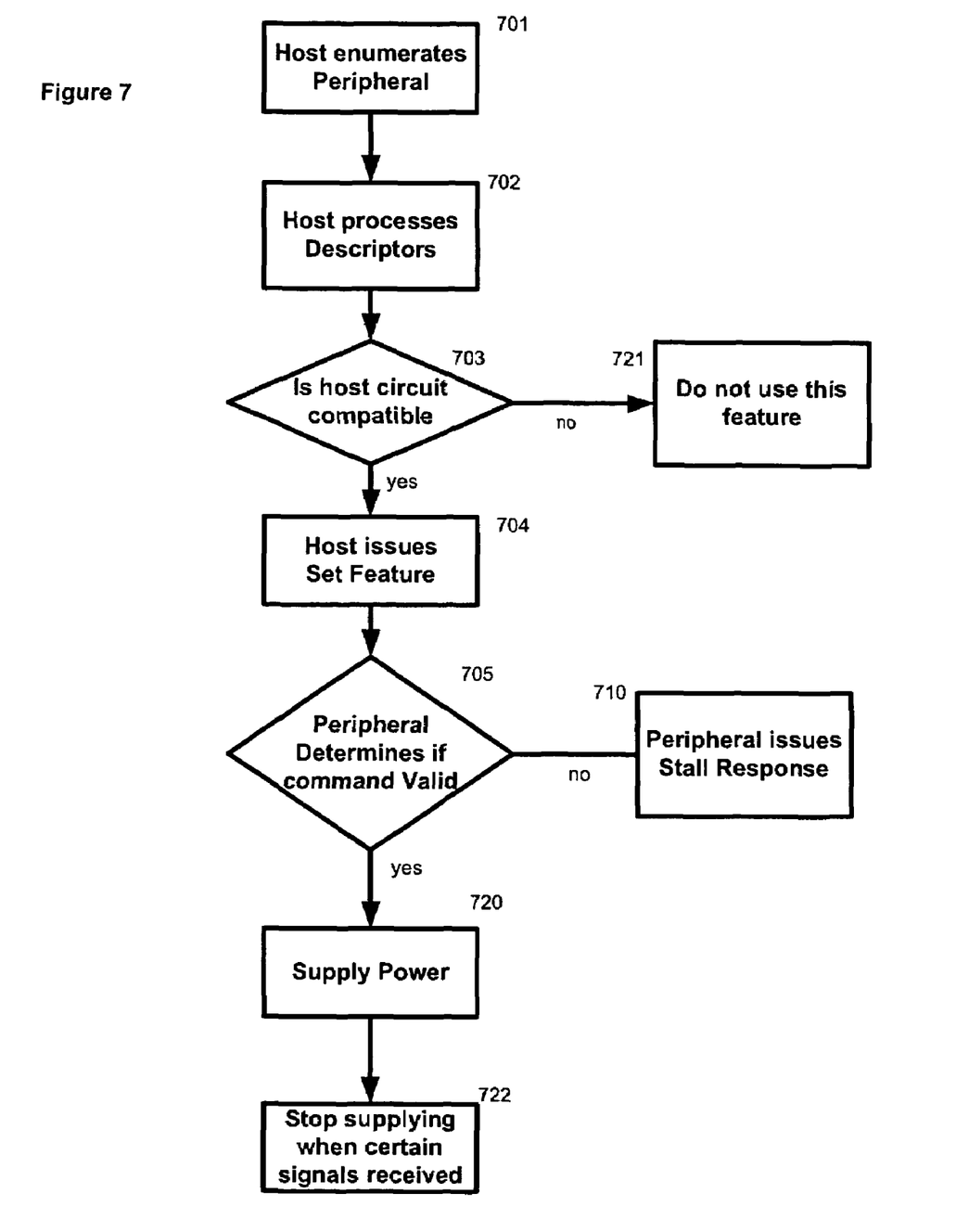
FIG. 7 is a block flow diagram showing the operation of the system.

FIG. 7 is a block flow diagram that illustrates the operation of the first embodiment of the invention. As indicated by block 701, when the host is activated, it enumerates the peripheral device and locates the USB descriptors in the peripheral device. The descriptors related to supplying voltage to the host are those described above. It should be understood that as is conventional, the host locates and reads a variety of descriptors in the peripheral device. The enumeration process is done in a conventional manner. As indicated by block 702, the host processes the descriptors and determines (as indicated by block 703) if the host's circuitry is compatible with the voltages that can be provided by the peripheral device. Naturally, if the hosts circuitry is not compatible with the available voltages, the feature is not used as indicated by block 721.

When the host would like to receive power from the peripheral device, the host issues a set Feature command as indicated by block 704. The peripheral device will receive the command as indicated by block 705 and determines if it is a valid command. As is conventional the peripheral device processes and tests the command received. If for some reason the command is not valid, the peripheral device issues a Stall response as indicated by block 710. If the command is valid the peripheral starts supplying power as indicated by block 720.

Power transmission stops (as indicated by block 722) when any one of the following occur:

1) A USB reset command is issued by the host:

2) A Clear Feature command is issued by the host:

3) A USB suspend command is issued by the host and a clear on suspend command was previously issued by the host:

4) Current draw drops to essentially zero after a USB suspend is detected.

Figure 6:
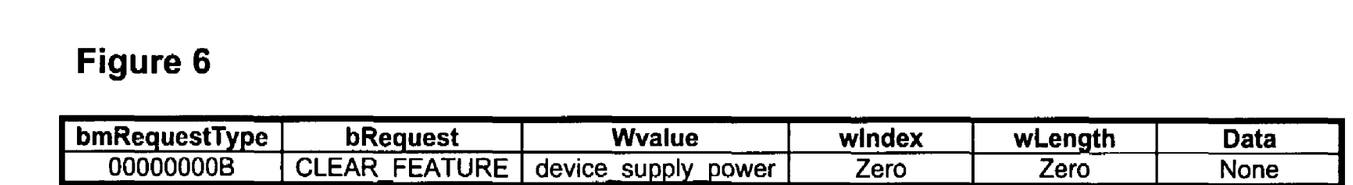
Figure 8:
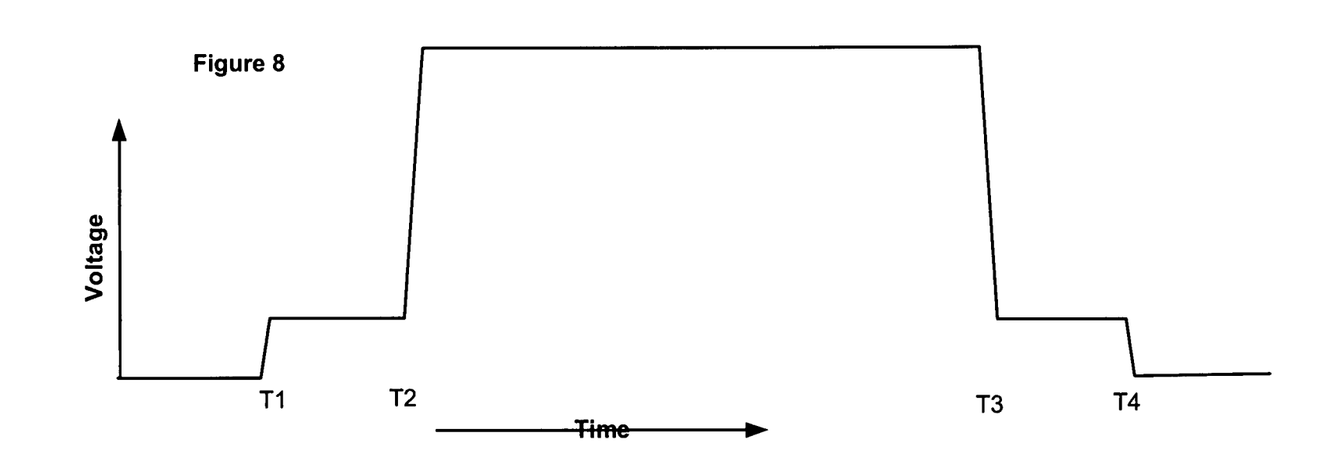
FIGS. 8, 9 and 10 are graphs showing the voltage over time under various conditions.
Figure 9:
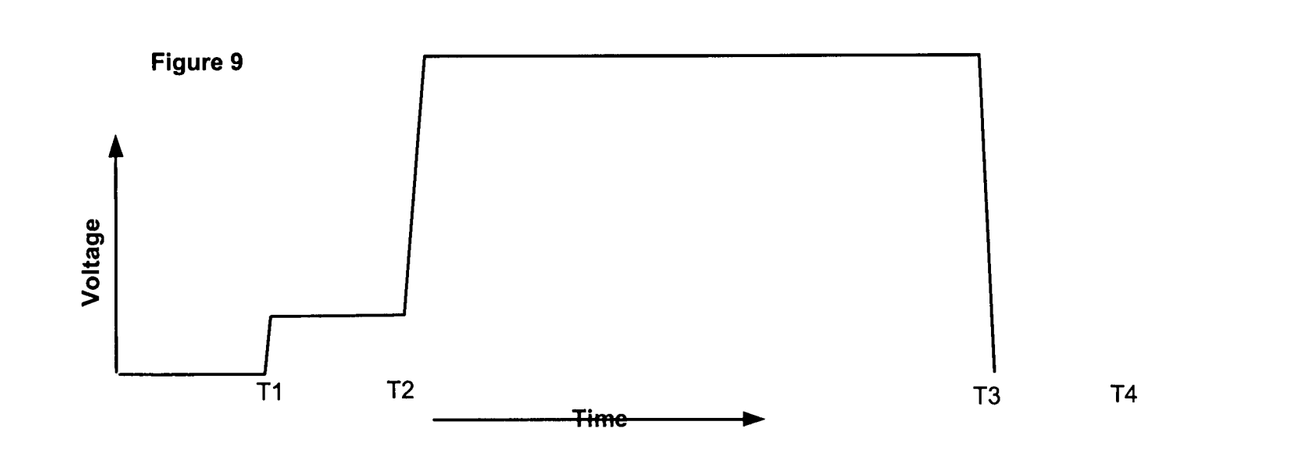
Figure 10:
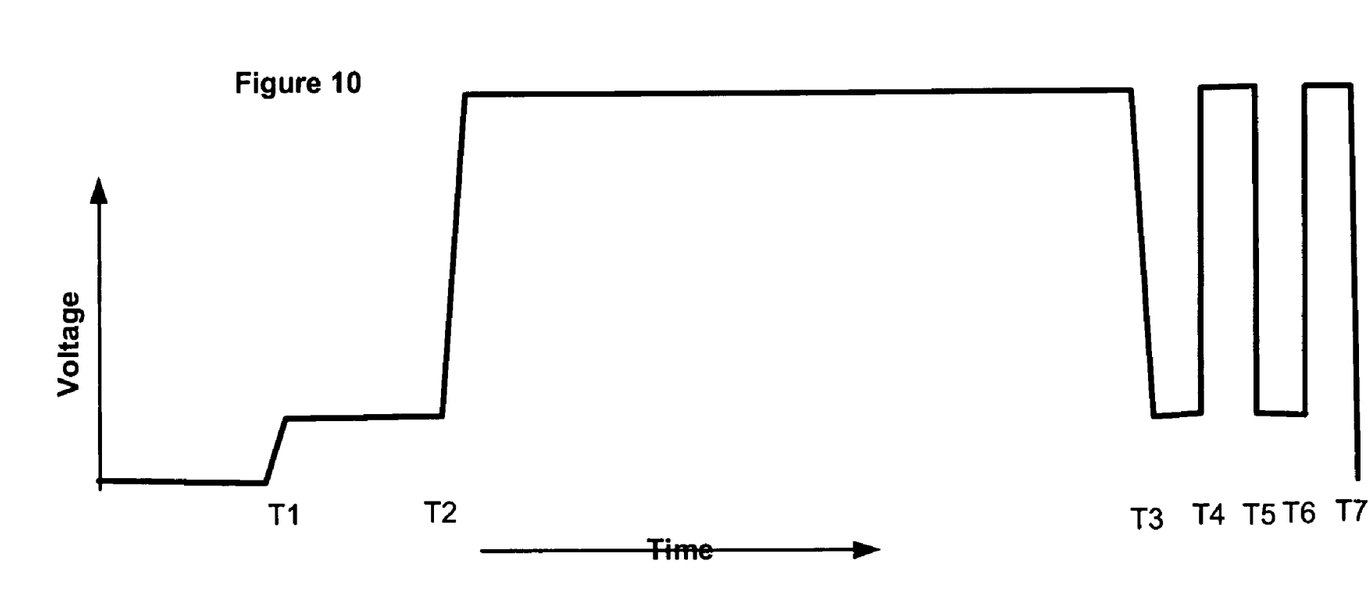

The voltage on the VBUS line over time under various circumstances is indicated by the graphs in FIGS. 8, 9 and 10. These figures relate to the first embodiment where the peripheral device only supplies one voltage to the host. The normal sequence is indicated by the graph in FIG. 8. At time T1, the host begins operating; the host enumerates in a normal manner and applies 5 volts on the VBUS line. If the circuitry in the host and in the peripheral device are compatible, at some later time, designated T2, the host decides that it would like to receive power from the peripheral device to charge its battery. The host will issue a set feature command such as that shown in FIG. 5 and the peripheral device will apply a higher voltage to the VBUS line. This high voltage will continue to a time T3 when the host issues a clear feature command as indicated in FIG. 6. The voltage then drops to 5 volts. At a time T4, the host stops operating and the voltage drops to zero.

FIG. 9 shows the voltage on the VBUS line in a situation where the start up is normal. That is, the action at times T1 and T2 are as previously described with reference to FIG. 8. However, in the example given in FIG. 9, at T3 time, the USB cable is accidentally (or intentionally) disconnected. At this point, as is conventional, a USB suspend operation will take place since the cable has been disconnected. When the USB suspend operation occurs, the peripheral device stops applying voltage to the VBUS line, and the voltage drops to zero.

FIG. 10 illustrates the situation where the enumeration operation occurs and the peripheral starts applying voltage at time T2 as described relative to FIG. 8. In this example the host has not issued a clear-on-suspend command; however, the host stops sending SOF (Start of Frame) signals. It is noted that, as is conventional, with a Full-Speed USB connection, the host issues SOFs every millisecond and with High-Speed connections, the host issues SOFs every 125 μs. (See USB 2.0 specifications, Section 8.4.3.1.).

Since SOFs stop arriving at the peripheral, the peripheral goes into suspend mode and it stops applying the high voltage to VBUS at T3. The peripheral does detect the 5 volt signal on VBUS and it again begins applying the high voltage at time T4. Again no SOFs are received and it goes into suspend. This pattern repeats until, in this example, the 5 volt signal is not detected on VBUS, so the peripheral no longer applies a voltage and the voltage goes to zero. The voltage is pulsed as illustrated in FIG. 10 to verify that a host is still attached and to allow the host to still receive power (at a lower duty cycle).

If a host is not attached (which is indicated by the absence of a five volt signal from the host) it is important that the voltage supplied from the peripheral device be turned off to guard against the possibility of a different host being attached and receiving the voltage from the peripheral device when such a host is not prepared to receive such a voltage. As indicated in FIG. 10, after time T3, a the VBUS line is checked periodically to determine if the host will supply five volts when the voltage from the peripheral device is turned off.

It is noted that except for the particular circuitry to supply power to the host, the other units in both the host and the peripheral device are conventional and follow the USB specifications. The USB descriptors that indicate this special feature in the peripheral device and the commands issued by the host conform to the general format for USB descriptors set out in the USB specifications. The USB specifications versions 1.1 and version 2.0 are hereby incorporated herein by reference.

As described above, in a second embodiment, the peripheral device can supply two fixed voltages, for example, 30 and 40 volts. In such an embodiment, the power supply (corresponding to power supply 403 in the first embodiment) would be a power supply that could either supply either 30 or 40 volts. In response to a command from the host (similar to the command shown in FIG. 6), the embedded processor (similar to processor 430) would inform the power supply to supply a particular one of the available voltages. It is noted that other embodiments could provide any number of fixed voltages, with one USB descriptor in the peripheral device for each voltage available. In such embodiment, the host would interrogate all USB descriptors and when appropriate request a particular voltage that it was designed to accept.

As described above, in a third embodiment, the peripheral device can supply a variable voltage. This third embodiment would operate similar to the above described second embodiment; however, the processor 420 would inform the power supply (corresponding to power supply 403) what particular voltage to supply in response to a command from the host to supply a particular voltage.

While the invention has been shown and described with respect a variety of embodiments, those skilled in the art will understand that various other embodiments are possible without departing from the spirit and scope of the invention. The scope of this invention is limited only by the appended claims.

We claim:

1. A system for providing power comprising:
    a host configured to identify compatible peripheral devices that can be used in supplying power to said host over a Universal Serial Bus (USB) connection between said host and a compatible peripheral device, said USB connection including a voltage line and a ground line,
    a power supply in said host to apply a first voltage to said voltage line,
    a power supply in the said peripheral device to apply a second voltage greater than said first voltage to said voltage line in response to commands received from said host to cause said power supply in said peripheral device to apply said second voltage to said voltage line without having to first determine whether said host is capable of receiving power over said USB connection,
    a battery in said host,
    a battery charging circuit in said host adapted to charge said battery when a potential is applied to said battery charging circuit, and
    a circuit in said host to connect said voltage line to said battery charging circuit when the potential on said voltage line is greater than said first voltage,
    wherein said battery in said host can be charged by said power supply in said peripheral device via said USB connection.

2. The system recited in claim 1 wherein said first voltage is five volts.

3. The system recited in claim 1 wherein said voltage greater than said first voltage is thirty volts.

4. The system recited in claim 1 including a USB descriptor stored in said peripheral device which indicates that said peripheral device can supply power to said host.

5. The system recited in claim 1 wherein said peripheral device is adapted to apply a plurality of different potentials to said voltage line.

6. The system recited in claim 5 wherein a USB descriptor is stored in said peripheral device for each voltage said peripheral device can apply to said voltage line, each description indicating that said peripheral device can supply one particular voltage to said voltage line.

7. The system recited in claim 1 wherein said peripheral device is adapted to apply a variable potential to said voltage line.

8. The system recited in claim 7 wherein a USB descriptor is stored in said peripheral device, said descriptor indicating that said peripheral device can apply a variable potential to said voltage line.

9. The system recited in claim 1 wherein said USB includes two data lines.

10. The system recited in claim 1 wherein said peripheral device includes a detector for detecting said first voltage on said voltage line.

11. The system recited in claim 10 wherein said peripheral device only applies said second voltage to said voltage line if said first voltage is present on said voltage line.

12. In a system that includes a host and a peripheral device, said host including a battery and a battery charging circuit, said peripheral device including a power supply, said host and said peripheral device being connected by a Universal Serial Bus (USB) connection, said USB connection including a voltage line and a ground line, a method of charging said battery in said host comprising, first determining if the power supply in said peripheral device and the battery charging circuit in said host are compatible, if the power supply in said peripheral device is compatible with the charging circuit in said host, connecting said power supply in said peripheral device to said voltage line in said USB connection in response to commands received from said host to cause said power supply in said peripheral device to apply a potential to said voltage line without having to first determine whether said host is capable of receiving power over said USB connection, connecting said battery charging circuit in said host to said voltage line in said USB connection when the potential on said voltage line rises above a threshold voltage, and, charging said battery in said host by power supplied by said power supply in said peripheral device.

13. The method recited in claim 12 wherein determining if the power supply in said peripheral device and the battery charging circuit in said host are compatible includes reading at least one USB descriptor from said peripheral device.

14. The method recited in claim 12 wherein said power supply in said peripheral device provides a potential greater than five volts.

15. The system recited in claim 1 wherein said host is a laptop computer.

16. A system for providing power comprising:
a host means configured to identify compatible peripheral devices that can be used in supplying power to said host means over a Universal Serial Bus (USB) connector means for connecting said host and a compatible peripheral device, said USB connector means including a voltage line and a ground line, power supply means in said host for applying a first voltage to said voltage line, power supply means in said peripheral device for applying a second voltage greater than said first voltage to said voltage line in response to commands received from said host to cause said power supply in said peripheral device to apply said second voltage to said voltage line without having to first determine whether said host is capable of receiving power over said USB connection, battery means in said host for providing power to said host, battery charging circuit means in said host for charging said battery when a potential is applied to said battery charging circuit means, and circuit means in said host for connecting said voltage line to said battery charging circuit means when the potential on said voltage line is greater than said first voltage, wherein said battery means in said host can be charged by said power supply means in said peripheral device via said USB connection.

17. The system recited in claim 16 wherein said first voltage is five volts.

18. The system recited in claim 16 wherein said voltage greater than said first voltage is thirty volts.

19. The system recited in claim 16 including a USB descriptor stored in said peripheral device which indicates that said peripheral device can supply power to said host.

20. The system recited in claim 16 wherein said power supply means in the said peripheral device can apply a variable potential to said voltage line.

* * * * *